United States Patent [19]

Boyle

[11] Patent Number: 4,488,512
[45] Date of Patent: Dec. 18, 1984

[54] FEEDSTOCK INJECTION SYSTEM FOR FLUIDIZED BED COMBUSTOR

[76] Inventor: Bede A. Boyle, Commonwealth Bank House, 140 Hunter St., Newcastle, N.S.W., 2300, Australia

[21] Appl. No.: 545,911

[22] Filed: Oct. 27, 1983

[30] Foreign Application Priority Data

Nov. 4, 1982 [AU] Australia .............................. PF6648

[51] Int. Cl.³ ............................................... F22B 1/00
[52] U.S. Cl. ............................. 122/4 D; 110/101 CD; 110/104 R; 110/263; 110/347; 110/165 R; 165/104.16
[58] Field of Search ........ 122/4 D; 110/245, 101 CD, 110/263, 346, 347, 165 R, 104 R; 165/104.16

[56] References Cited

U.S. PATENT DOCUMENTS

| 4,203,391 | 5/1980 | Knoebel et al. | 122/4 D |
| 4,259,911 | 4/1981 | Jones | 110/245 |
| 4,424,766 | 1/1984 | Boyle | 122/4 D |

Primary Examiner—Edward G. Favors
Attorney, Agent, or Firm—Stevens, Davis, Miller & Mosher

[57] ABSTRACT

A hydro-pressurized fluidized bed combustor having an uptanding shell and an entry at its bottom for admission of feedstock. The feedstock passes through a conduit surrounded by a heat exchanger. Inside the shell an entry conduit is outwardly flared in the upward direction to furnish a controlled expansion entry feeding into the fluidized bed. The entry conduit has a plurality of tuyeres in its peripheral wall. An injector pump feeds the feedstock into the entry. A weir above the entry conduit keeps the height of the bed constant within the combustion during operation.

6 Claims, 3 Drawing Figures

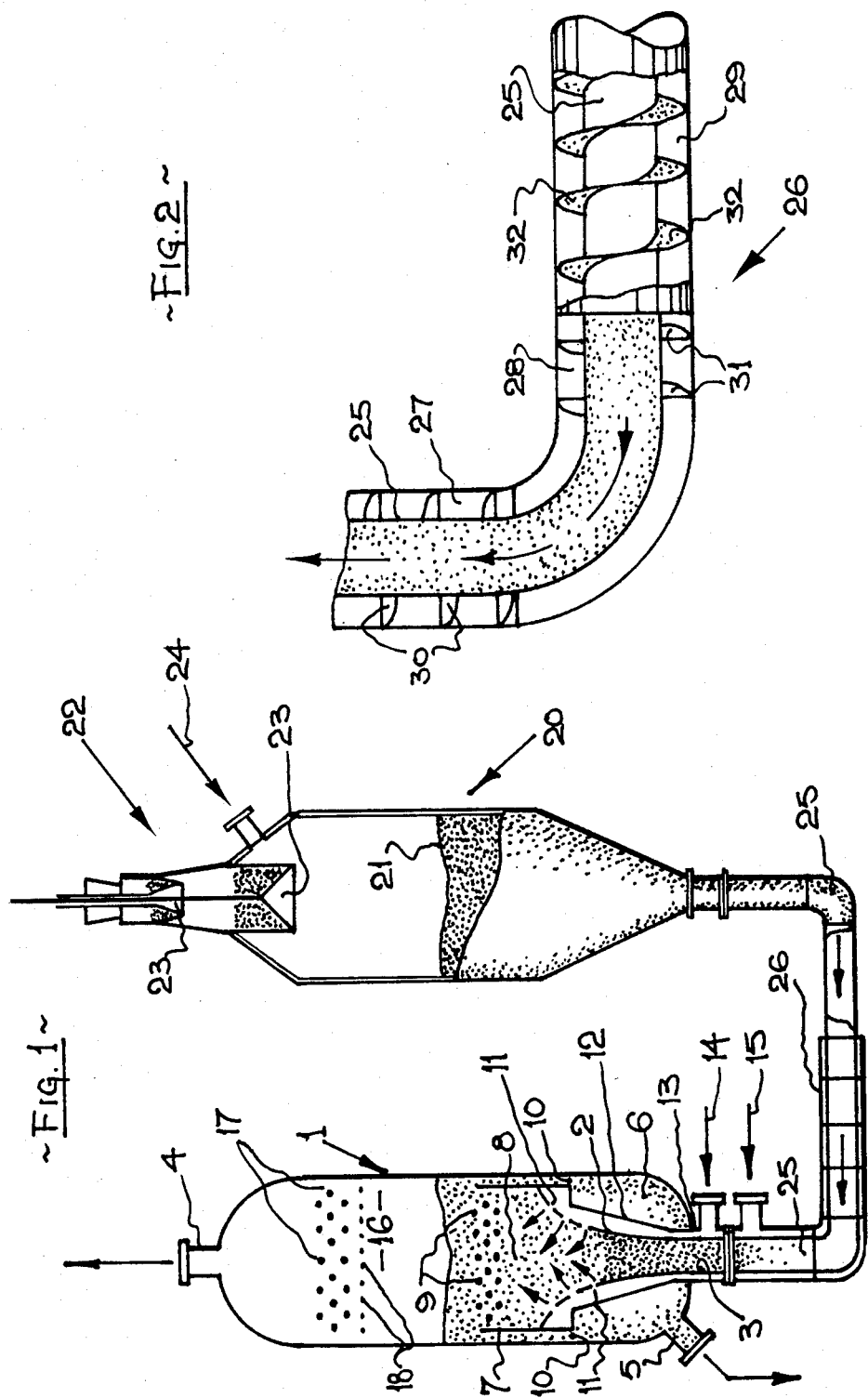

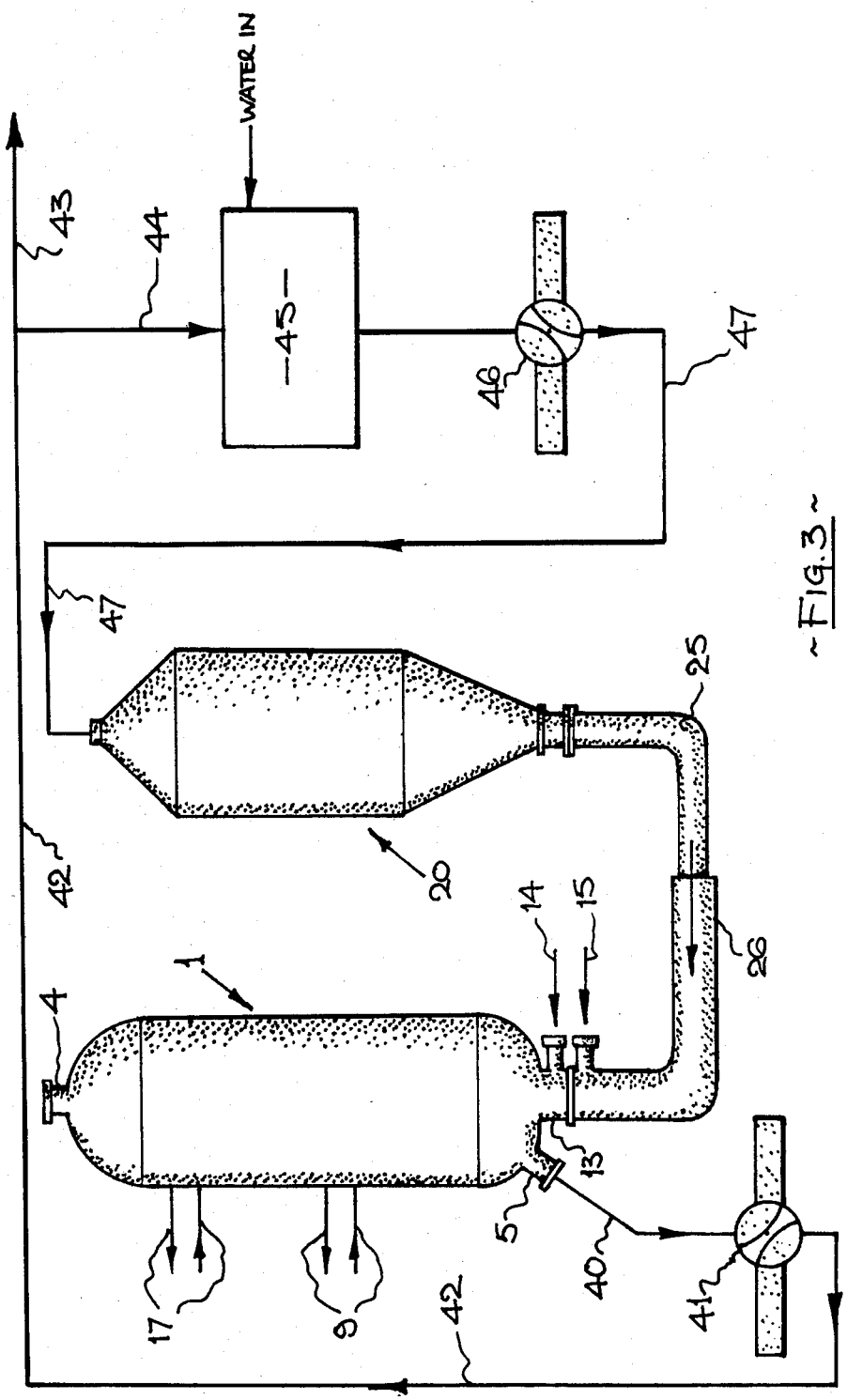

FEEDSTOCK INJECTION SYSTEM FOR FLUIDIZED BED COMBUSTOR

This invention relates to the hydro/pressurized fluidized bed combustor art, and more particularly to an improved feedstock injection system for such a combustor.

The state of the fluidized bed art is set out in U.S. Pat. No. 3,902,462 (Bryer); U.S. Pat. No. 4,103,646 (Yerushalmi et al); U.S. Pat. No. 4,159,682 (Fitch et al); U.S. Pat. No. 4,191,115 (Yang et al); U.S. Pat. No. 4,259,911 (Jones); U.S. Pat. No. 4,280,876 (Green); U.S. Pat. No. 4,287,838 (Frosch); U.S. Pat. No. 4,424,766 (Boyle) and in such publications as the reports of the coal research section of NCB (IEA Services Ltd. of the United Kingdom.

Briefly, in fluidized bed combustion, the fuel is typically burned in a bed of inert particles through which air is passed. The velocity of the air is sufficient to support the weight of the particles, so that the bed bubbles like a boiling liquid. Combustion in such a system is efficient, and has several advantages over conventional techniques, including:

(a) reduced boiler costs and more compact combustion systems because of high heat transfer rates to steam generating tubes immersed in the bed;

(b) high tolerance of coal type and mineral matter content;

(c) because of relatively low operating temperatures, fluidized bed combustors can be made of less exotic steels;

(d) if the combustor is operated under pressure around 10 to 20 atmospheres, it is possible for the fuel gases to be exhausted through a gas turbine;

(e) atmospheric pollution can be reduced by adding limestone or dolomite to the bed to prevent the emission of sulphur dioxide.

It was an object of the invention of the present applicant's co-pending U.S. Pat. No. 4,424,766 to optimize the design of pressurized fluid bed combustors (PFBC) for applications in the power generation field, thus making redundant high energy conversions for working the existing technology. All fluidized beds hitherto had required large volumes of air at high velocities and pressure to establish the fluid bed concept, and thus another object of the invention of U.S. Pat. No. 4,424,766 was to dispense with the necessity for this medium. This last-mentioned object was achieved by replacing all the usual air compressors, drives, turbines, reduction gears, pressure vessels, valves and interconnecting piping by one single unit of simplified design and novel concept.

It has now been found that heat can be transferred at a higher rate, temperature and air and steam supply can be more easily controlled, and carry-over of carbon can be limited by providing a feedback injection system for a PFBC which does not require the use of an injector pump, and which confines combustion to the top part of the fluidized bed. The most important properties of coal are those associated with its behaviour when heated, with or without the presence of air. When heated, most coals evolve tarry vapours, gas and moisture; in the presence of air the combustibles burn—the tarry vapours with a smokey flame, the gases with a non-smokey flame, while the solid residue glows, leaving ash derived from the mineral matter.

For coal combustion, intimate mixing of air and coal must take place. There must be a compromise between providing excessive quantities of air and coal surface available for combustion. As the supply of large quantities of air at pressures above atmospheric is both capital and energy intensive, it is proposed to use only sufficient air to provide complete combustion compatible with the particle size of the feedstock.

According to the present invention, the feedstock is fed into the combustor through a jacketed entry port and comprises a pre-determined mixture of coal, steam and air with perhaps some limestone or dolomite. The state of equilibrium existing between the supporting force of the gas flow and the gravitational force of the individual particles is maintained by the high momentum steam (gas bubbles) passing through the hot bed of particulate material. The particles remain in contact with the other surrounding particles with pronounced impulse exchange, leading to continuous change in location of the particles. This results in a fluidized bed having properties which correspond to the behaviour of liquids.

The carbon concentration is usually less than 1% so that a minimum amount of air is required for complete combustion. The formation of large gas bubbles is prevented by the arrangement of the heating surfaces immersed in the fluidized bed; that is, the fluidized bed is stabilized by them and rendered uniform over the cross-section of the heating space.

In the present applicant's co-pending Australian U.S. Pat. No. 4,424,766, fuel, steam and combustion air were fed into the combustor through a single entry port, and therefore combustion would commence soon after the feedstock entered the vessel. This proved to be a distinct disadvantage, in some applications at least, in that the requirement that the flame front should travel in the opposite direction to the primary air was not fulfilled, with the result that temperature control was not always easily achieved. In the present invention, coal slurry is forced into the vessel after passing through a heat exchanger, while combustion air enters a contoured entry conduit via peripheral tuyeres in its walls. Thus, combustion is initiated towards the top of the bed and the flame front tends to move downwardly, its velocity being matched by the rising coal.

Therefore, according to the present invention there may be provided a hydro/pressurized fluidized bed combustor comprising an upstanding shell having, at the bottom thereof, an entry port for the low velocity entry of feedstock to said combustor, said feedstock including particulate solid material, steam and water; a pressurized hopper for said feedstock; a feedstock conduit in communication with said entry port and with said pressurized hopper, said feedstock conduit being surrounded, for at least a part of its length, by a heat exchanger; an upstanding, contoured entry conduit having a trumpet-shaped catenoid vertical cross-section gradually enlarging in the upward direction, said conduit being accommodated within the lower half of said upstanding shell and in communication with said entry port, said entry conduit being provided with a plurality of tuyeres in its peripheral wall; a jacket surrounding said entry conduit and in communication with a further jacket surrounding said entry port, said entry port jacket being provided with air and steam inlets; a fluidized bed in the upper portion of said entry conduit, for combustion of said feedstock; at least one in-bed cooling tube located within a combustion zone of the fluidized bed; at least one freeboard steam generation tube located above said combustion zone; and a weir located above said entry conduit and in communication with it, the said weir acting to extract ash from said fluidized bed at a rate which keeps the height of the bed constant within the combustor during operation thereof. Preferably, the feedstock hopper is of the same diameter as the combustor and is pressurized by air or steam to the same working pressure as the combustor.

The reader will gain a better understanding of the present invention by having regard to the accompanying drawings of a preferred embodiment thereof, which are by way of example only, and in which:

FIG. 1 shows a PFBC and associated hopper;

FIG. 2 shows the heat exchanger in more detail; and

FIG. 3 shows a preferred system of ash disposal.

Referring first to FIG. 1, the hydro/pressurized fluidized bed according to the present invention comprises an upright shell, generally referenced 1, preferably composed of a steel outer shell and a refractory inner shell of alumina fire-brick material. Accommodated within the lower half of upstanding shell 1 is an upstanding, contoured entry conduit 2 having a trumpet-shaped catenoid vertical cross-section which thus presents a gradually-enlarging transverse cross-section in the upward direction, the lower portion of conduit 2 being in communication with an entry port 3. At the top of shell 1 is a flue 4 and in the bottom is located an ash discharge port 5 for the removal of ash or spent fuel from ash storage space 6. A preferred system of ash disposal will be hereinafter described with reference to FIG. 3. Above conduit 2 is an annular weir 7 the purpose of which is to extract ash from the fluidized bed. The upper part of conduit 2, together with weir 7, contains the fluidized bed the combustion zone 8 of which is towards the top of the bed, and in this combustion zone is located a bank of in-bed cooling tubes 9. Extending about the junction of conduit 2 and weir 7 is an annular grate 10. The catenoid entry conduit has a plurality of tuyeres 11 in its peripheral wall and is surrounded by a jacket 12 which is in communication with a further jacket 13 surrounding entry port 3. Entry port jacket 13 is provided with an air inlet 14 and a steam inlet 15. In the freeboard space 16 above combustion zone 8 is a bank of steam generation tubes 17 and, ideally, a smaller bank 18 of superheater tubes.

A pressurized feedstock hopper, generally referenced 20, contains the feedstock 21 which may very well be water-slurried coal. The feedstock is continuously fed to the hopper 20 by a known entry system referenced 22, having two or more bell closures 23. In the upper part of hopper 20 is an inlet port 24 for the supply of the pressurising air or, preferably, steam. A feedstock conduit 25 provides communication between combustor 1 and hopper 20, and surrounding a part of the length of this conduit 25 is a heat exchanger 26. As has been noted, ideally the feedstock hopper has the same diameter as the combustor and is pressurized to the same working pressure.

Heat exchanger 26 is shown in more detail in FIG. 2. It partially surrounds feedstock conduit 25 and is divided into a number of sections 27, 28, 29, etc. in each of which is a helical fin flight, as 30, 31, 32, etc.

The particulate materaial of the bed is heated by propane gas burners or similar devices for both warm-up and initial ignition of the fuel. When operating temperature has been reached, the hopper is pressurized and the bed is then on normal operation and the burners are shut down.

The pressurising gas in the hopper acts as a piston to force feedstock through the conduit 25 and the heat exchanger 26. The water content of the feedstock slurry is converted to steam in the heat exchanger 26, which is supplied with superheated steam from the superheater tubes 18 in the freeboard space of the combustor, this expansion feeding the feedstock into the bottom of the combustor. The feedstock and steam rise in the catenoid entry conduit 2 where air enters through the peripheral tuyeres 11 in the sides. Combustion is initiated near the top of the bed and the flame front moves downwards, its rate of travel being matched by the rising flow of fuel.

The system thus fulfils the requirement of the flame front travelling in the opposite direction to the primary air. Volatile matter from the fuel mixes with the air and ignites as it passes through the incandescent top layer of the bed. The volatile matter will burn only provided that it is well mixed with oxygen, is maintained at a temperature above 600° C. and has sufficient residence time—perhaps 0.5 of a second—for the oxidation to go to completion. The present invention meets these conditions of sufficient time, temperature and turbulence by the novel injection system which utilizes steam "bubbles" expanding for both feeding the fuel and supplying the necessary turbulence and agitation of the particulate material, that is to say, "fluidising" the bed material. The violent bursting of gas steam bubbles at the bed surface tends to carry solid particles into the freeboard space. This bubble action is important also in the lateral transport of particles across the bed, giving complete circulation and intermingling of the particles, and thus even distribution of the fuel is attained.

In the highly agitated bed, a proportion of the gas and steam bubbles passes upwards and grows by coalescence as the mass of material rises, the velocity of these bubbles exceeding the mean gas velocity. These bubbles entrain fuel particles in their wake, so lifting them, and in their upward travel the bubbles push some fuel particles sideways, and on bursting spread particles radially across the bed, the particles then sinking to be recirculated rapidly vertically and more slowly horizontally, giving rise to efficient and rapid mixing and combustion.

Output reduction is achieved by reducing the air supply and by isolating sections of the heat exchanger and, if required, employing feed water in these isolated sections for cooling.

When a tube bundle is immersed in the combustion bed, the effect is of all the particles of the bed whirling around the tubes, resulting in a very high heat transfer coefficient from bed to tubes. That there is perhaps only one in every two hundred particles actually burning explains why there is practically no risk of agglomeration, or formation of slag or clinker, and the entry velocity of the feedstock (including combustion air) is only 1 to 2 linear feet/second. At the low velocities of the present invention there is no erosion of the cooling tubes, and only a very small amount of the finest ash particles is likely to be carried off from the top of the bed. These particles have not been exposed to high temperature and are therefore not sintered; they are not hard or abrasive and can be separated by cyclone. Ash is drawn off at bed level over the lip or rim of the weir 7, and is discharged from the storage zone 6 at the bottom of the shell, through ash discharge port 5.

FIG. 3 shows, somewhat schematically, a preferred system for the disposal of ash and/or spent fuel emanating from the ash discharge port 5, after the material has been extracted from the fluidized bed by weir 7 operation. From port 5, ash and/or spent fuel is made to pass along a duct 40 by operation of an oscillating deflector pump 41, of the kind described and claimed in applicant's copending U.S. application Ser. No. 610,471, filed May 15, 1984 and claiming priority of Australian Parent Application No. PF 9486/83 of May 23, 1983.

Oscillating deflector pump 41 is provided with a grease interface between the hot ash effluent and the labyrinth seals of the pump's deflector member. The grease used should ideally contain both graphite and molybdenum disulphide, and should be such as to be suitable for use at elevated temperatures to provide a heat-resisting film on the bearing surfaces. Such a film may be continually replaced from the ingredients contained in the high-temperature-resistant grease mix.

From oscillating deflector pump 41, ash and/or spent fuel from the combustor is pumped through a duct 42 for ultimate disposal via branch duct 43 or for recycling via branch duct 44. In the recycling mode, ash and/or spent fuel pumped through recycling branch duct 44 enters a drum mixer 45, in which it may be enhanced or enriched by the addition of extra pulverised coal or coke, limestone or dolomite, and water.

From drum mixer 45, a second oscillating deflector pump 46 delivers the ash and/or spent fuel to be recycled to the pressurized feedstock hopper 20 through the duct 47.

The basic features of the hydro/pressurized fluidized bed combustor as described hereinbefore show clearly why there is no limitation on the amount of ash that the fuel can produce, and the "caking" phenomenon is completely obviated.

From the abovegoing, the reader will readily appreciate that hydro/pressurized fluidized bed combustors constructed in accordance with the present invention will provide the public with new or highly-improved plant or, at the very least, will offer to it a most useful and very attractive choice.

The claims defining the invention are as follows:

I claim:

1. A hydro/pressurized fluidized bed combustor comprising an upstanding shell having, at the bottom thereof, an entry port for low velocity entry of feedstock to said combustor, said feedstock including particulate solid material, steam and water; a pressurized hopper for said feedstock; a feedstock conduit communicating said entry port with said hopper, said feedstock conduit being surrounded, for at least a part of its length, by a heat exchanger; an upstanding, contoured entry conduit having a trumpet-shaped catenoid vertical cross-section gradually enlarging in an upward direction, said entry conduit being accommodated within the lower half of said upstanding shell and in communication with said entry port, said entry conduit being provided with a plurality of tuyeres in its peripheral wall; a jacket surrounding said entry conduit and in communication with a further jacket surrounding said entry port, said entry port jacket being provided with air and stream inlets; a fluidized bed in the upper portion of said entry conduit, for combustion of said feedstock; at least one in-bed cooling tube located in a combustion zone of said fluidized bed; at least one freeboard steam generation tube located above said combustion zone; and a weir located above said entry conduit and in communication therewith, said weir acting to extract ash from said fluidized bed at a rate which keeps the height of the bed constant within the combustor during operation thereof.

2. The hydro/pressurized fluidized bed combustor as claimed in claim 1, wherein said feedstock hopper is of the same diameter as the combustor.

3. The hydro/pressurized fluidized bed combustor as claimed in claim 1, wherein said feedstock hopper is pressurized by air or steam to the same working pressure as the combustor.

4. The hydro/pressurized fluidized bed combustor as claimed in claim 1, wherein ash and/or spent fuel is pumped from an ash discharge port of said combustor, by means of an oscillating deflector pump, for either ultimate disposal or recycling.

5. The hydro/pressurized fluidized bed combustor as claimed in claim 4, wherein said oscillating deflector pump is provided with a heat-resisting grease interface between the hot ash effluent and labyrinth seals of a deflector member of said pump, the said grease containing graphite and molybdenum disulphide.

6. The hydro/pressurized fluidized bed combustor as claimed in claim 4, wherein said ash and/or spent fuel is pumped for recycling into a drum mixer for enhancement by extra particulate solid material and water, and thence, by means of a second oscillating deflector pump, back into said pressurized feedstock hopper.

* * * * *